United States Patent [19]

Ebersole

[11] Patent Number: 4,982,400
[45] Date of Patent: Jan. 1, 1991

[54] RING BUS HUB FOR A STAR LOCAL AREA NETWORK

[75] Inventor: Ronald J. Ebersole, Beaverton, Oreg.

[73] Assignee: Intel Corporation, Santa Clara, Calif.

[21] Appl. No.: 291,594

[22] Filed: Dec. 29, 1988

[51] Int. Cl.$^5$ .............................. H04J 3/14; H04J 3/26
[52] U.S. Cl. .................................. 370/85.15; 370/94.3
[58] Field of Search ........................ 370/86, 85, 88, 89, 370/94, 85.1, 85.5, 85.9, 85.11, 85.12, 85.14, 85.15

[56] References Cited

U.S. PATENT DOCUMENTS

| | | | |
|---|---|---|---|
| 4,383,314 | 5/1983 | Tam | 370/86 |
| 4,554,659 | 11/1985 | Blood et al. | 370/86 |
| 4,569,041 | 2/1986 | Takeuchi et al. | 370/86 |
| 4,675,671 | 6/1987 | Ishizuka et al. | 370/85.5 |
| 4,700,185 | 10/1987 | Balph et al. | 370/85.13 |
| 4,752,924 | 6/1988 | Darnell et al. | 370/86 |
| 4,769,813 | 9/1988 | Lenart | 370/86 |
| 4,805,168 | 2/1989 | Kato | 370/89 |
| 4,809,267 | 2/1989 | Higuchi et al. | 370/86 |

Primary Examiner—Douglas W. Olms
Assistant Examiner—Min Jung
Attorney, Agent, or Firm—Owen L. Lamb

[57] ABSTRACT

A ring hub in a local area network. A parallel ring bus (20, 22, 24, 26) connects a plurality of ring controllers (10, 12, 14, 16) in a closed loop. At reset time one controller (12) is selected to act as a ring monitor and is not connected to a network node. Each one of the remaining controllers are connected to a single node, so that one controller is linked to a corresponding node. The ring monitor and the ring controllers communicate by inserting message packets onto the bus and stripping messages and control information off of the bus. A transfer request packet is used by a source controller (10) to signal a destination controller (14) for permission to send a data packet. A packet acknowledge signal is generated at the destination controller (14) by asserting one of the bus control lines. The packet acknowledge signal is used to signal to the source controller that the transfer request packet has been received and placed in a request queue (40) at the destination controller. A send data reply packet is used by the destination controller to signal the source controller that the queued request can now be serviced. Data packets are inserted on the ring bus by the source controller to send the actual data message.

12 Claims, 8 Drawing Sheets

FIG. 3 RING BUS PORT

FIG. 4 PACKET HEADER

FIG. 5 TRANSFER REQUEST

FIG. 6 BROADCAST REQUEST

FIG. 7 UNIVERSAL TRANSFER REQUEST

FIG. 8 SEND DATA REPLY

FIG. 9 CLUSTER NETWORK HEADER

RING BUS HUB FOR A STAR LOCAL AREA NETWORK

CROSS REFERENCE TO RELATED APPLICATIONS

This application is related to the following copending patent applications. "Local Area Network Having an Active Star Topology" Ser. No. 07/291,700 of Ronald Ebersole, et al.; "Cluster Link Interface" Ser. No. 07/291,756 of Ronald Ebersole; and "Node Controller for a Local Area Network" Ser. No. 07/291,640 of Ronald Ebersole, all filed concurrently herewith and assigned to Intel Corporation.

BACKGROUND OF THE INVENTION

1. Field of the Invention

The invention relates to data processing systems and more particularly to a method and apparatus for communicating among a plurality of network nodes connected to the hub of a local area network.

2. Description of the Related Art

A Local Area Network, or LAN, is a data communications system which allows a number of independent devices to communicate with each other within a moderately sized geographical area. The term LAN is used to describe networks in which most of the processing tasks are performed by a workstation such as a personal computer rather than by shared resources.

A LAN node consists of a desktop workstation which performs processing tasks and serves as the user's interface to the network. A wiring system connects the workstations together, and a software operating system handles the execution of tasks on the network.

The configuration of the various pieces of the network is referred to as the topology. In the star topology the switching control is at the center of the network, with all of the attached devices, the individual workstations, shared peripherals, and storage devices, on individual links directly connected to the center of the star. In the star configuration, all of these devices communicate with each other through the center which receives signals and transmits them out to their appropriate destinations.

The ring bus topology employs a circular bus route known as a ring. In a slotted ring configuration, signals pass around the ring to which the devices are attached.

Ring networks are flexible in that new devices can be easily added and taken away. But because the signal is passed from end to end on the ring bus, the length of the network cable is limited. Star topologies have the advantage that the workstations can be placed at a considerable distance from the center of the star. A drawback is that star topologies tend to be much slower than bus topologies because the center of the star is involved in every transmission.

In a star configuration, the signaling method is different than in bus or ring configurations. In the star configuration the center of the star is involved in all of the communication signals. In a bus topology, communications messages have no central controller. Each device attempts to send signals and enter onto the bus when it needs to. If some other device tries to enter at the same time, contention occurs. To avoid interference between two competing signals, bus networks have signaling protocols that allow access to the bus by only one device at a time. The more traffic a network has, the more likely it is that a contention will occur. Consequently, the performance of a bus network is degraded if it is overloaded.

Ring bus configurations have more complex signaling protocols. The most widely accepted method in ring networks is known as the token ring, a standard used by IBM. An electronic signal, called a token, is passed around the circuit collecting and giving out message signals to the addressed devices on the ring. There is no contention between devices because a device does not signal to gain access to the ring, it waits to be polled by the token. The advantage is that heavy traffic does not slow down the network. However, it is possible that the token can be lost or it may become incoherent or disabled by failure of a device on the network to pass the token on.

In the above-identified copending application Ser. No. 07/291,700 there is described a local area network architecture based on a active star topology. Nodes attach to the hub of the star through duplex communication links. Messages transferred between nodes are passed through the hub, which is responsible for arbitration and routing of messages. Each node of the active star responds only to those messages that are addressed to it. Routing of messages is accomplished by a destination address in the header of the message. These addresses are unique to each node and provide the means by which the hub keeps the communication between nodes independent.

It is an object of the present invention to provide a hub for a star local area network which provides a means for routing messages received at the hub without the need for special arbitration mechanisms.

SUMMARY OF THE INVENTION

A parallel ring bus connects a plurality of ring controllers in a closed loop which provides the hub of a star local area network servicing a number of nodes remotely connected to the hub. At reset time one controller is selected to act as a ring monitor and is not connected to a network node. All other controllers are each connected to a single node. The ring monitor and the ring controllers communicate by inserting message packets onto the bus and stripping messages and control information of the bus. A transfer request packet is used to signal the destination controller for permission to send a data packet. A packet acknowledge signal is generated by asserting one of the bus control lines and is used to signal that the transfer request packet has been received and placed in a request queue. A send data reply packet is used to signal the source controller that the queued request can now be serviced. Data packets are used by the source to send the actual data message.

The invention has the advantage that when two nodes want to communicate with the same destination, the hub arbitrates between them and buffers the message from the node that is locked.

The invention has the advantage that arbitration is fair on each channel, but priority requests can override normal arbitration.

The invention has the further advantage that control message regulate message flow of packets on the ring bus based on available message space in a destination buffer, so that messages are not lost by overruns.

The invention has the further advantage that control messages are mulitplexed with the transmitted data packets on the ring bus but do not have to be passed over the link to the node, thereby increasing the bandwith of the link.

The invention has the further advantage that control messages provide for programmable message routing, thereby providing a reconfigurable network.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

The hub ring of the present invention will be referred to throughout this specification as the cluster. The cluster combines many of the advantages of the prior art ring bus topology with the advantages of the prior art star network topology. Prior ring buses are characterized by fixed access latencies and the simple manner by which the physical network can be expanded. The prior slotted ring and token ring implementations exploit these advantages, but suffer from performance limitations due to the media speed and network architecture. In the prior art rings, the ring control logic is located in each node. The logic is connected to each of two neighbors by means of the network physical media. The maximum performance of the complete ring is therefore determined by the bandwidth of the particular media connecting the nodes.

Figure 1:
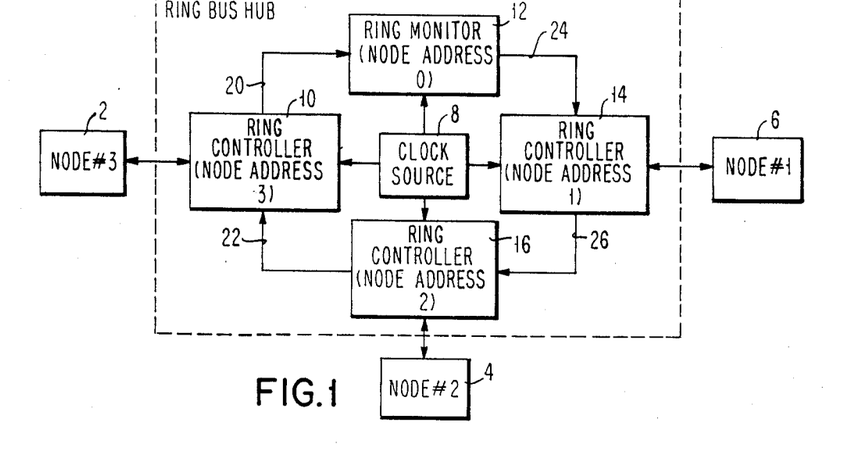
FIG. 1 is a functional block diagram of the ring bus hub of the present invention.

The ring bus of the present invention, shown in FIG. 1, avoids this performance bottleneck by separating each node from its ring controller (as shown in detail in FIG. 2) by remotely connecting the node to the controller over a link interface. The node then communicates with the controller over the link interface. Only the data associated with the individual node passes over the link. In the prior art, all data from communicating nodes passes through the link. Furthermore, the ring apparatus of the present invention is of the insertion ring type, eliminating many of the problems of a token ring.

The Ring Controllers in the hub are not connected by means of cables as in the prior art because they are not physically separated over a large geographical area. The ring controllers are components placed on a printed circuit (PC) Board, where they take advantage of parallel buses and high frequency clocks instead of the media limitations of interconnecting links.

Referring to FIG. 1, messages flow into a Ring Controller (10) from a node (3) via its link interface (18). The messages are then transferred to the destination node's Ring Controller over the ring bus (20). The bandwidth required by each node is only a percentage of the bandwidth provided by the ring bus, allowing multiple messages to be carried simultaneously between pairs of nodes.

HUB ORGANIZATION

The structure of the ring bus hub is illustrated in FIG. 1. The ring bus is formed by directly connecting together cluster interface controllers (10, 12, 14, 16), described in copending application Ser. No. 07/291,640. Each controller has the Ring Controller mode selected. A Ring Controller (10) is connected to a node through its link interface (18), and to two other Ring Controllers through its ring output port (20) and its ring input port (22). The bus formed by the ring controllers is a closed loop through which messages flow in a single direction around the loop. The data paths are 32-bits wide between the Ring Controllers.

CLUSTER RING BUS

Information flows on the ring bus from a source node, for example node 1 to a destination node, for example node 3. Data flows from the source node into its connected controller (14) and is progressively passed on to the next controller (16) until it reaches the controller (10) of the destination node. The data packet itself requires three contiguous bus cycles and can be visualized as a snake that enters the ring bus, and occupies a portion of it while it is transferred. A controller (16) can be receiving data on its input port while transferring the previously received data on its output port.

The Cluster Ring Bus implementation has the following characteristics:

(1) Data is transferred in packets of 256 bytes or less. A packet occupies up to 64 consecutive bus cycles (4 bytes per cycle) as it is placed on the bus by a Ring Controller.

(2) Messages larger than 256 bytes are broken into multiple packets for transfer on the Ring Bus. The source and destination Ring Controllers handle the packets as a complete, contiguous message. Other messages for the same destination are queued until the complete message of multiple packets currently being transferred is completed.

(3) Each packet is preceded by a Ring Packet Header, containing destination and source addresses along with control information.

(4) Headers are generated and used by the Ring Controllers for controlling the transfer of packets on the Ring Bus. They are not passed over a link to the destination node.

(5) Control packets consisting of only a Ring Packet Header without data are used to establish and control the transfer of a message between the source and destination Ring Controllers.

(6) Packets are placed on the ring by the source Ring Controller and removed by the source after circulating around the complete ring through each of the Ring Controllers.

(7) Destination Ring Controllers copy the packet and indicate their reception of the packet by asserting the "Packet Ack" (Packet Acknowledgement) line. The control lines run in parallel with the packet data and are transferred on each clock cycle just like the packet. The source Ring Controller detect the "Packet Ack" as it removes the packet from the bus.

(8) Each Ring Controller can place only a single packet on the bus at a time. It must remove its previous packet before it can transfer a new packet.

(9) Additional packets can be inserted on the ring by other Ring Controllers only at packet boundaries or when there is no traffic. Packets are contiguous blocks of data that cannot be separated.

MESSAGE PACKETS

Larger messages are broken into multiple packets to achieve lower transfer latency and improved efficiency on the ring bus. Each packet is transferred at the maximum clock rate of the hub rather than the link interface rate of the attached node.

Figure 2:
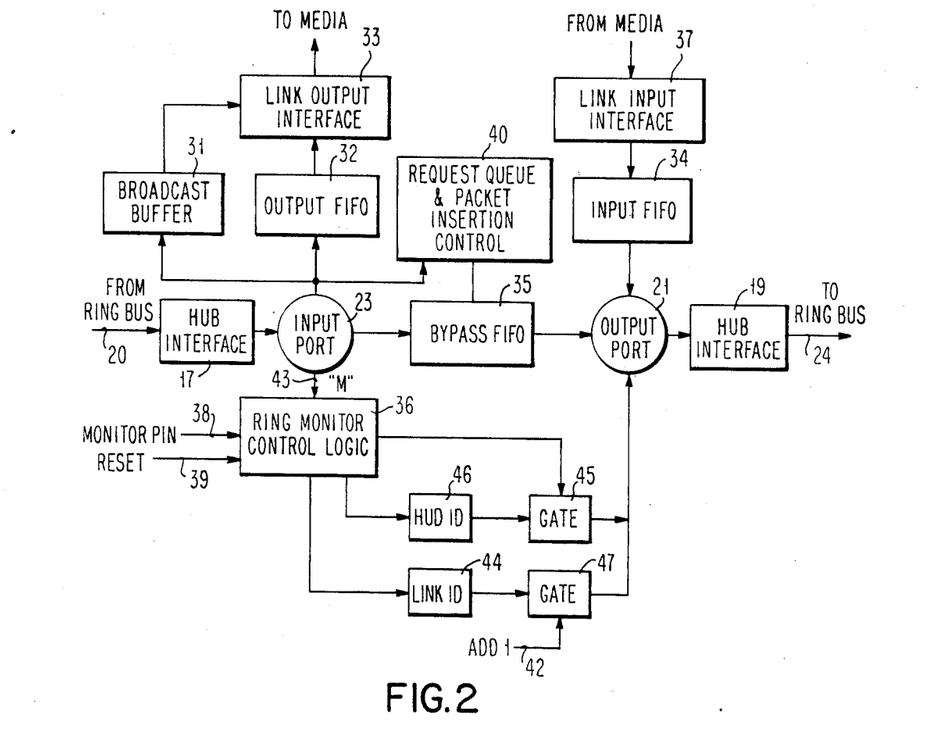
FIG. 2 is a functional block diagram of a ring controller of FIG. 1.

Referring to FIG. 2, the Input FIFO (34) and Output FIFO (32) provide buffering for collecting the data from the node before it is transferred on the ring bus (20), and for receiving data (22) at the ring bus rate. The broadcast buffer (31) is used to receive and buffer messages broadcast from a single node to several nodes.

While the next packet of a message is collected at the ring controller input FIFO (34), the ring bus is available for data packet transfers between other Ring Controllers. A destination Ring Controller is able to transmit the packet over its attached link with the destination node, while waiting for the next packet. The large FIFOs foresee message blocking conditions existing at destination nodes or other hubs, by allowing data to be collected at the source node controller until the destination path is free to accept the data.

The maximum message size supported by the Cluster is 4.5K bytes and requires 18 independent packets to transfer the message. For messages that can not be divided into an integral number of 256 byte segments, the last packet contains the remainder of the message. Only the last packet (or only packet in the case of a single-packet message) of a message is less than 256 bytes of data.

INPUT AND OUTPUT PORTS

Each Ring Controller has an Input Port (23) and an Output Port (21) used for receiving packets from the upstream Ring Controller and transmitting packets to the downstream Ring Controller. These are unidirectional ports, one receiving, the other transmitting. Data is transferred from every Output Port to every Input Port on the Ring Bus each Ring Bus Cycle. If there is no packet to be transferred during the cycle, this state is indicated by a "No Packet Transfer" encoding on the control lines.

Figure 3:
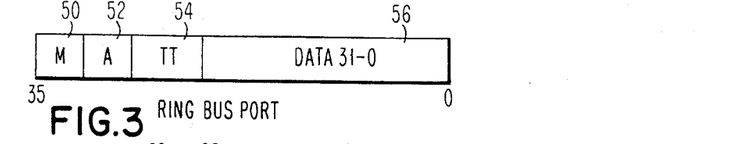
FIG. 3 is a diagram of a ring bus port signal definition.

The ring bus port signal definition is shown in FIG. 3. 4 of the 36 signal lines (50, 52, 54) for the port are used for control, while 32 bits (56) are used for packet header or ring data. The TT bits (54), or "Cycle Type" signals are used to identify the current state of the packet transfer. 00 identifies the first cycle of a packet, 01 all cycles between the first and last, and 10 the last cycle in a packet. The minimum Ring packet size is two bus cycles.

TT=11 identifies the cycle as a "No Packet Transfer" cycle. Packets can follow one after another without any cycles in between. When a packet is placed on the Ring Bus by a Ring Controller, the "A" (Packet Ack.) signal (52) and "M" (Monitor) signal (50) are deasserted.

The "Packet Ack." signal is asserted when a Ring Controller recognizes that the packet is addressed to itself. The signal is asserted only on the second cycle of the packet as it is placed on the output port of the destination Ring Controller. It then circulates around the Ring Bus with the packet and is removed with the packet by the source Ring Controller. The source Ring Controller uses the presence, or absence, of the "Packet Ack" signal to determine its next operation.

The Monitor Signal is used by the Monitor Ring Controller to identify packets that contain errors.

RING PACKET HEADERS

Figure 4:
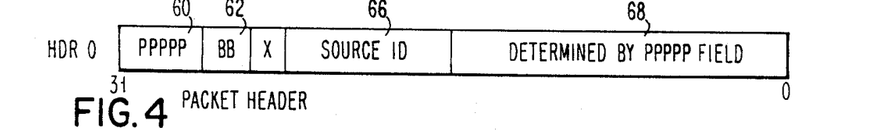
FIG. 4 is a diagram of the packet header field definition.

The Packet Header is organized as shown in FIG. 4. A header is constructed by the source of the packet. The information in the header is used for communication between Ring Controllers and is not included in the message transmitted to the node. Packet headers contain the destination address (68) of the message and the source ID (66), from 0 to 255, from the Ring Controller. The 5-bit encoded Packet Identifier (60) defines the function of the packet and how to interpret the remaining fields. The length of the packet header is determined by the function of the packet.

The fields of the Packet Header are defined as follows:

| Packet Identifier PPPPP | for Command Packets: |
|---|---|
| 00000 | Initialization Command |
| 00001 | Start Command |
| 0001x | reserved |
| | for Control Packets: |
| 00100 | Transfer Request |
| 00101 | Broadcast Request |
| 00110 | Universal Transfer Request |
| 00111 | Send Data Reply |
| 01xxx | reserved |
| | for Data Packets: |
| 10000 | Data Packet |
| 10001 | Last Data packet |
| 1001x | reserved |
| 10100 | Broadcast Data Packet |
| 10101 | Broadcast Last Packet |
| 1011x | reserved |
| 11xxx | reserved |
| BB | |
| 00 | 1 valid byte in last word of packet |
| 01 | 2 valid bytes in last word |
| 10 | 3 valid bytes in last word |
| 11 | 4 valid bytes in last word |

Source ID: 8 bit ID from the Ring Controller sourcing the message.

The Initialization Command Packet (PPPPP=00000) is a special packet used to clear the state of the Ring Controllers and initialize the addresses. All in-process transactions are aborted and incoming messages from the links are ignored until the Start Command Packet is received. Initialization sequences are defined below. The two command packets are one bus cycle in length.

There are 4 control packet encodings (shown in FIGS. 5-8), in which only the Ring Packet Header is transferred. Control packets implement the Ring Bus protocol used for transferring a message from one Ring Controller to another. Control packets are used to establish communication between source and destination Ring Controllers and provide flow control. Control packets are either 2 or 3 bus cycles in length, depending on the function.

A message transfer consists of one or more transfers of 256 byte packets with 4-byte Ring Packet Headers. The last, or only packet, of the header contains the proper number of bytes to complete the actual message length. For messages that are not integral number of 4-byte words, the last word in the last packet has less than four bytes. This is identified by the BB field (62) in the header. The BB field identifies the number of significant byte positions in the last word of the data in the last or only packet of the message. The BB control bits have no meaning for any of the other Packet Identifier encodings.

Figure 7:
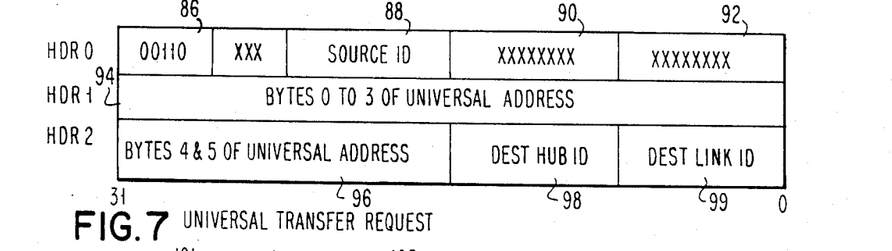
FIG. 7 is a diagram of the Universal Transfer Request packet header.
Figure 8:
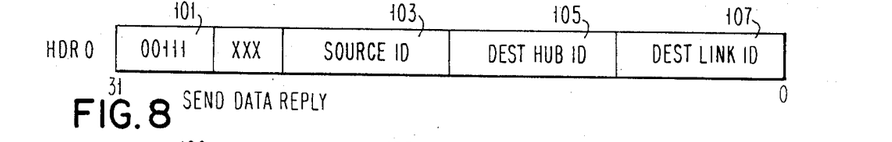
FIG. 8 is a diagram of the Send Data Reply packet header.

Three types of headers are sent by a source Ring Controller. The Transfer Request packet header (FIG. 5), the Broadcast Request packet header (FIG. 6), and the Universal Transfer Request packet header (FIG. 7). In FIG. 8, the Dest Hub ID and Dest Link ID together define the Native mode address returned by the destination Ring Controller whose address matches the Universal Address.

The Send Data Reply (FIG. 9) is the only packet type sent by a destination Ring Controller. The Source ID is an 8 bit Link ID from the source Ring Controller whose node is sourcing the message.

Figure 5:
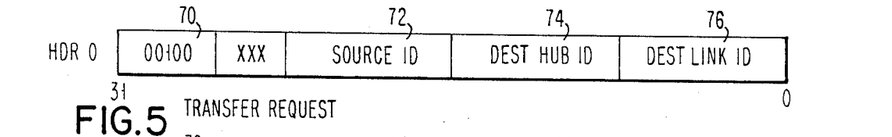
FIG. 5 is a diagram of the Transfer Request packet header.
Figure 6:
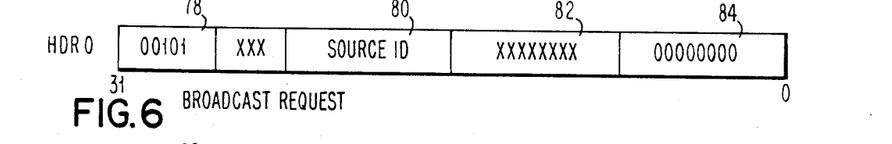
FIG. 6 is a diagram of the Broadcast Request packet header.

As more fully described in copending patent application Ser. No. 07/291,756, the ring bus hub may be connected to another ring bus hub via a link interface to a ring controller in one of the nodes, for example node #1 (6). In this case the ring controller in the node #1 could be part of a destination hub which has a configuration similar to the ring bus hub shown in FIG. 1, with one or nodes connected to it. It therefore is necessary to be able to distinguish those nodes of the destination hub from the nodes of the hub where a message originates. To do this the Dest Hub ID 974) shown in FIG. 5 is defined. The Dest Hub ID (74) is an 8 but HUB ID that identifies the hub to which the destination node is connected. The Dest Link ID is an 8 bit Link ID of the destination node. The Send Data Reply packet is used to regulate the Flow of information from the source Ring Controller. The address fields for the Send Data Reply header retain their same meaning, that is, the Source ID still refers to the Ring Controller sourcing the message on the Ring Bus. The destination ID is still the message destination address. The source Ring Controller processes incoming packets looking for its Source ID in the Source ID field of the header and a Packet Identifier (PPPPP00111) for "Send Data Reply". All other Packet Identifiers are decoded and processed by the destination Ring Controller whose link ID matches the Destination ID in the packet.

PACKET ARBITRATION

Refer to FIG. 2 New packets are placed on the ring through a "register insertion" mechanism which includes a bypass FIFO (first-in first-out) register (35). While the new packet is transferred to the next Ring Controller, over the hub interface (20), incoming packets are stored in the bypass FIFO. FIG. 2 illustrates the location of the bypass FIFO relative to the Ring Input port (23) and the Ring Out-put port (21). The bypass FIFO determines the size of a packet that can be inserted on the ring. All packets must be less than or equal to the bypass FIFO size to prevent losing incoming data.

The Ring Controller allows up to 272 bytes, 256 bytes of data and 16 additional bytes of header, to be buffered while a new packet is inserted on the ring. The bypass FIFO is a fall-through FIFO that only inserts a small number of cycles of delay from input port to output port when it is empty. Each entry in the FIFO adds another stage in the ring bus delaying the transfer of incoming packets through the Ring Controller. The total delay path on the ring is dynamic, based on the number and size of packets on the ring at any given time. The maximum delay is limited by the rule that each Ring Controller may have only a single packet on the ring at a time, and the bypass buffer size. The total delay path increases or decreases to accommodate the total amount of traffic on the ring at any single moment.

The FIFO entries are reduced whenever there is no incoming packet from the node or a when a packet sourced by the Ring Controller returns and can be discarded. Returning packets received at the hub interface (22) are discarded at the input port (23) while data in the bypass FIFO 935) is transferred out on the Ring Output Port (21). The speed at which a Ring Controller can transfer packets on the ring is determined by the average transit time of each packet and the rate at which the destination will accept new data. Loading on the ring simply delays the transfer of an individual packet. Any Ring Controller can add a new packet if it does not have packets currently progressing around the ring, by inserting the packet at the next available packet boundary.

Transfer rate and arbitration are straight forward and merely depend on the loading. The circulation of packets back to the source works as simple gate-on-transfer of new packets. Access is equal and fair for all Ring Controllers with a built-in queuing of transfer requests that cannot be immediately serviced.

MESSAGE ARBITRATION

Messages are composed of one or more packets and constitute the basic element of transfer between nodes. Packets from the same message must be grouped and kept together, in order, as a single unit on the network. In order for a source Ring Controller to transfer a message to a destination Ring Controller, it must first establish communication with the destination Ring Controller. This is accomplished through use of the control packets which are headers without any data.

MESSAGE TRANSFER PROTOCOL SEQUENCE

FIGS. 11A-11D are flow diagrams of the message transfer protocol sequence. A Transfer Request control packet (FIG. 6) is sent to the destination to start the transfer. If the destination is busy, it queues the request in its request queue until it is ready. The source Ring Controller waits until the destination indicates that it is ready by sending a Send Data Reply control packet (FIG. 9) addressed to the source ring controller. This occurs when the request reaches the top of the Request queue in the destination Ring Controller, and the destination controller has space in its Output FIFO.

The source sends a Data Packet in response to the Send Data Reply control packet and waits until it receives another Send Data Reply control packet from the destination before sending the next packet. In the mean time, if the destination receives any other Transfer Request packets during the current message transfer, it will place them in its Request queue.

The end result is a time-ordered queue of messages from different sources being sent to the destination node. All messages are kept together as a contiguous group of packets. Arbitration between messages is fair and no source will get starved as only one message can be coming from any single Ring Controller at a time.

The Request queue is a fall-through FIFO containing the source ID of the Ring Controllers requesting service. It is a 256 entry FIFO to handle the maximum number of links that can be attached to a single hub.

INITIALIZATION/SYNCHRONIZATION SIGNALS

The following signals provide synchronization between Ring Controllers and provide initial starting state.

RING CLOCK

The Ring Bus is synchronous. Each Ring receives a RC1K input from the common hub clock source. It is a de-skewed 1X clock signal generated by a single clock source. The 1X clock is doubled within the Ring Controllers to generate two phases per clock. The clock signal defines the Ring Bus cycle. Data are sampled from the bus every RC1k falling edge.

RING RESET

The Reset signal is cynchronous to the clock and must remain asserted for a sufficient number of clock cycles to insure that all Ring Controllers are reset. The Ring Controllers are initialized after the reset signal has been deasserted. The Monitor Ring Controller initializes the hub with Command Packets after the deassertion of Reset, as shown in the flow diagrams of FIGS. 10A-10C.

MONITOR MODE

One controller per hub is identified as the Ring Monitor by asserting the Ring Monitor pin (38) before Reset (39) is deasserted. It must be asserted through the last clock that the Reset is asserted. The Ring Monitor pin of the controller designated as the Ring Monitor is used to input the Hub ID of the ring hub to which it is attached. The Hub ID is passed to the other Ring Controllers with the Initialization Command.

RING MODE

The CLIC mode pin, which identifies the cluster interface controller (clic) as either a Node Controller or Ring is asserted before and during the time Reset is asserted. It identifies the I/O Pin usage for the mode chosen and therefore the other valid inputs during Reset. This is described more fully in the above-referenced copending application Ser. No. 07/291,640 (D-1241)

RING MONITOR

The one Ring Controller selected during Reset to be the Ring Monitor provides the following centralized control functions for the hub:

(1) Initialization of Ring Controllers. All Ring Controllers receive the synchronous Reset. After Reset is complete, they remain idle until initialized by the Ring Monitor through the Initialization and Start Commands, as shown in the flow diagrams of FIGS. 10A-10C.

(2) Distribution of Ring controller IDs. The Ring Monitor (12) has a Link ID of 0 and all other Ring controllers are initialized relative to it. The downstream Ring Controller (14) is initialized by the Ring Monitor to a Link ID of 1, with the next (16) on taking on an ID of 2, etc. The Hub ID is also distributed to the other ring controllers by the Ring Monitor after it receives it through the Monitor Mode pin during initialization.

(3) Removal of Corrupted Packets. Data transferred on the Ring Bus can be corrupted as it is transferred around the Ring. If the header is corrupted the source may not recognize the message, allowing it to continue circulating forever. The Ring Monitor uses the Monitor Control signal to determine a corrupted packet and removes it from the Ring.

(4) Broadcast Message Co-ordination. Messages to be broadcast throughout the network (those with a the Group bit set in the destination address) are ordered and controlled through the Ring Monitor, as shown in the flow diagrams of FIGS. 12A-12C. The Ring Monitor acts as the destination rather than having all the Ring Controllers try to respond.

The additional logic for the Ring Monitor function is included in every controller, but is activated only in the controller selected at reset time as the Ring Monitor. The controller identified as the Ring Monitor is not attached to any node via a link.

Figure 10A:
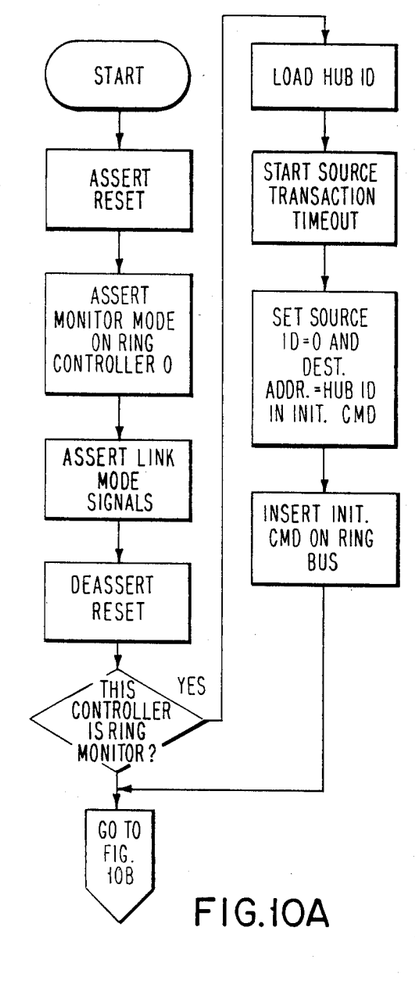
FIGS. 10A-10C are flow diagrams of the initialization sequence.
Figure 10B:
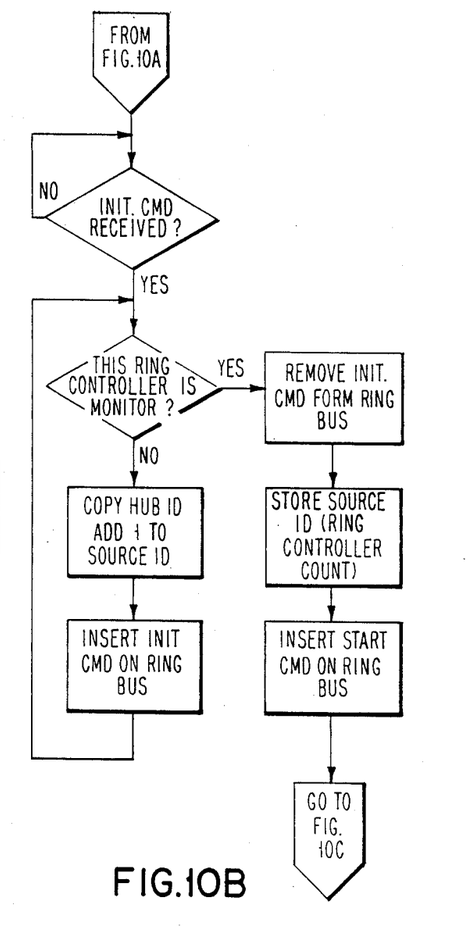
Figures 10C, 11A:
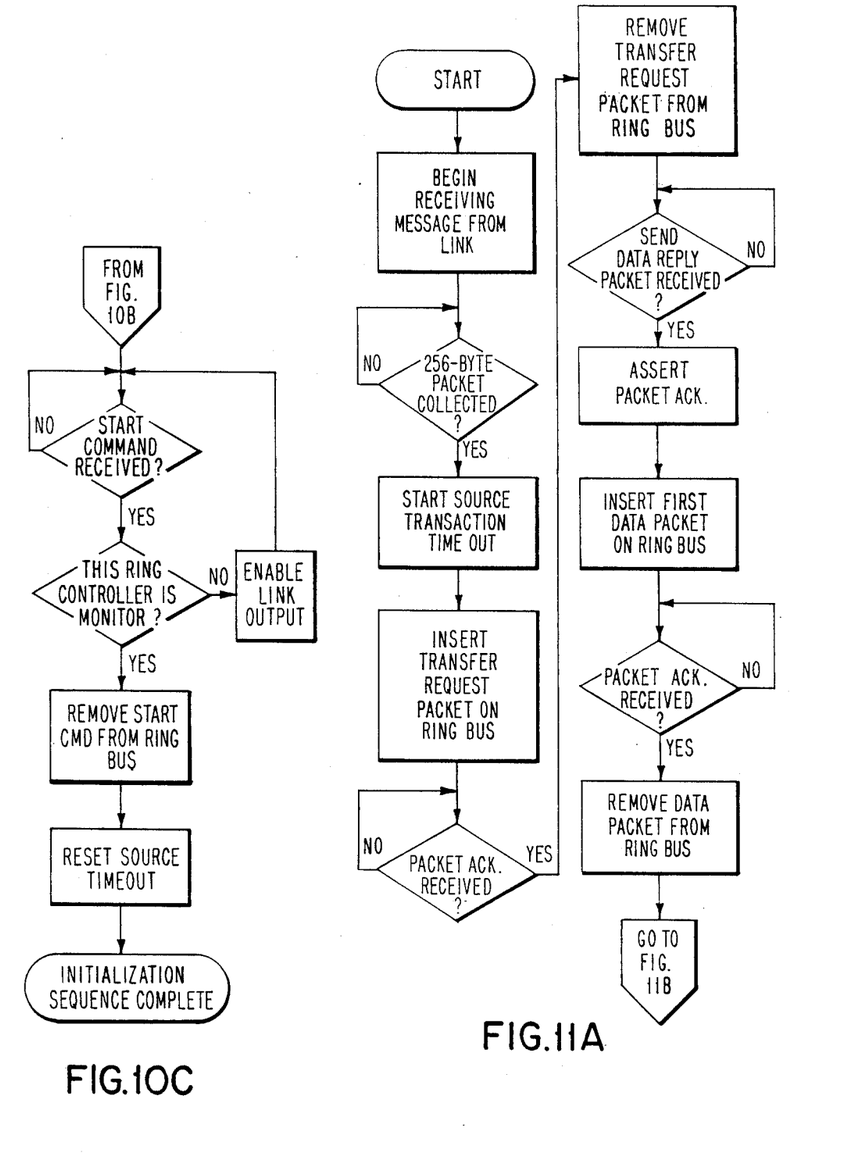
FIGS. 11A-11d are flow diagrams of the message transfer protocol sequence.
Figure 11B:
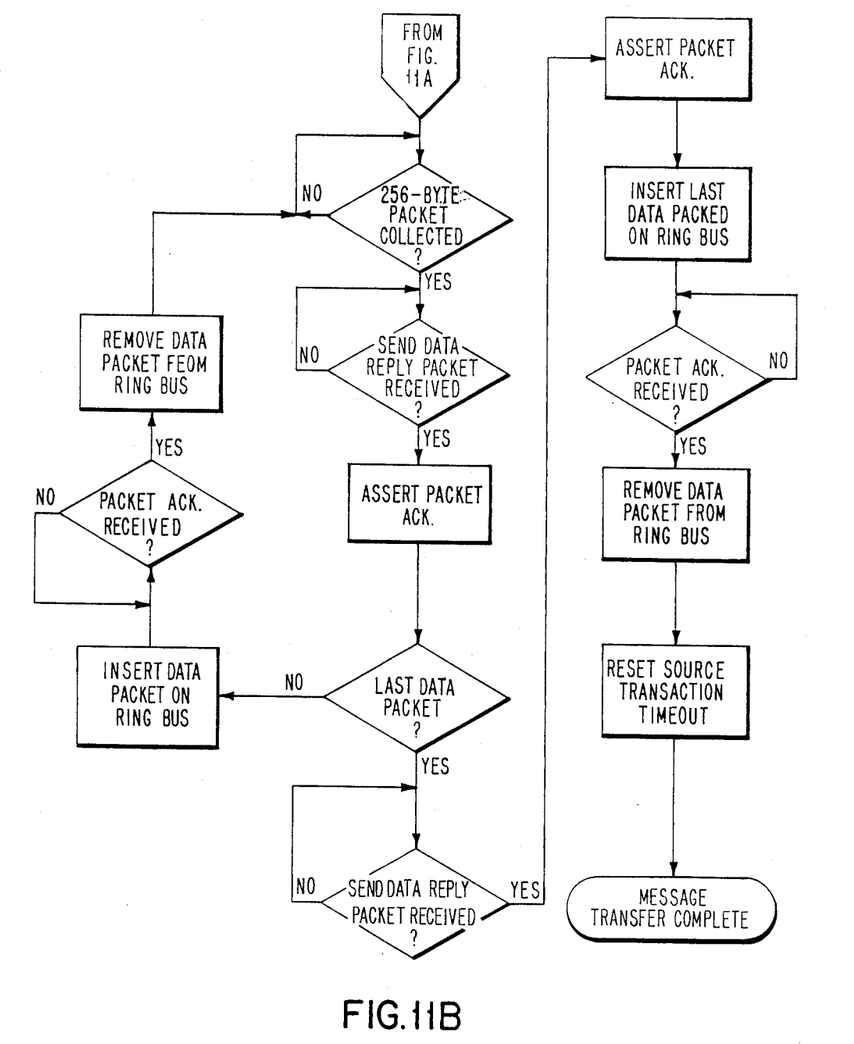
Figure 11C:
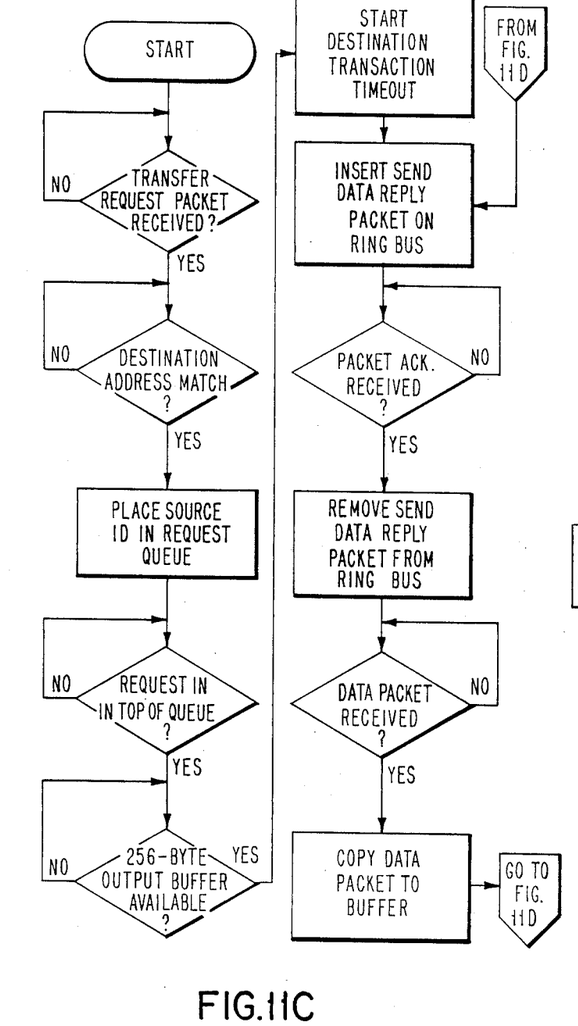
Figure 11D:
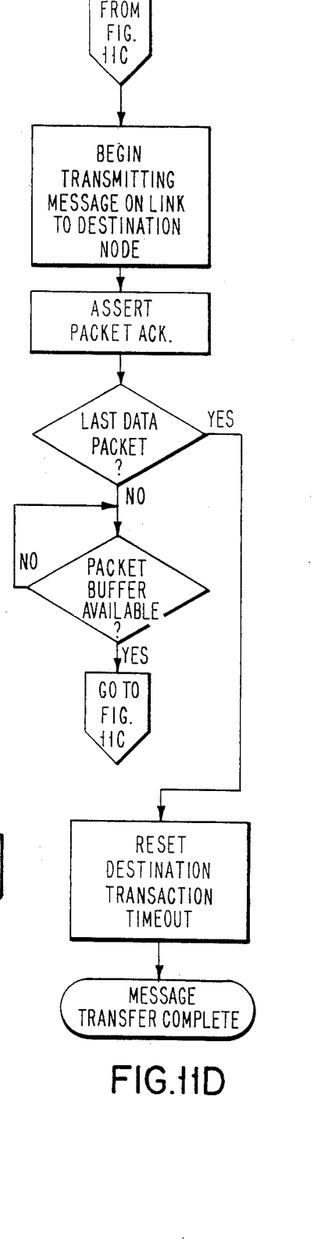
Figure 12A:
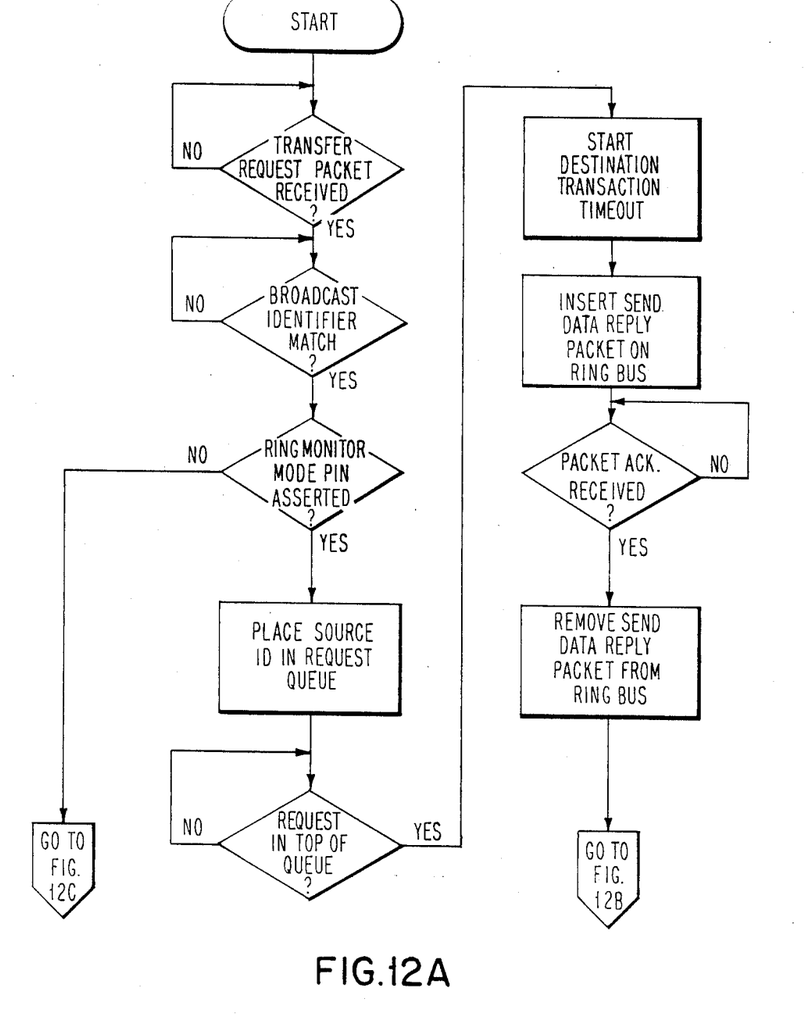
FIGS. 12A-12C are flow diagrams of the Group or Broadcast message transfer protocol sequence.
Figure 12B:
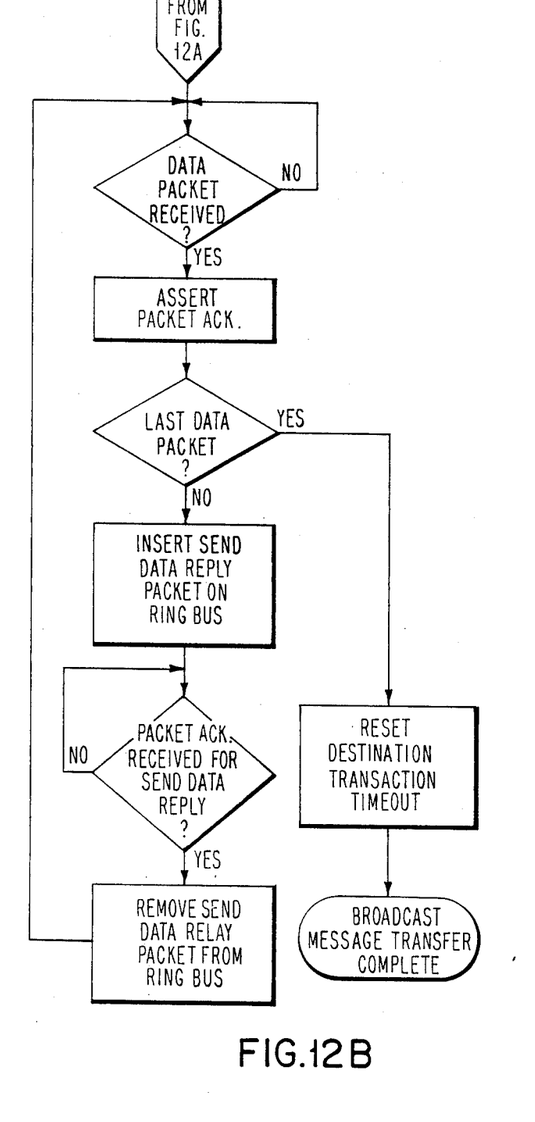
Figure 12C:
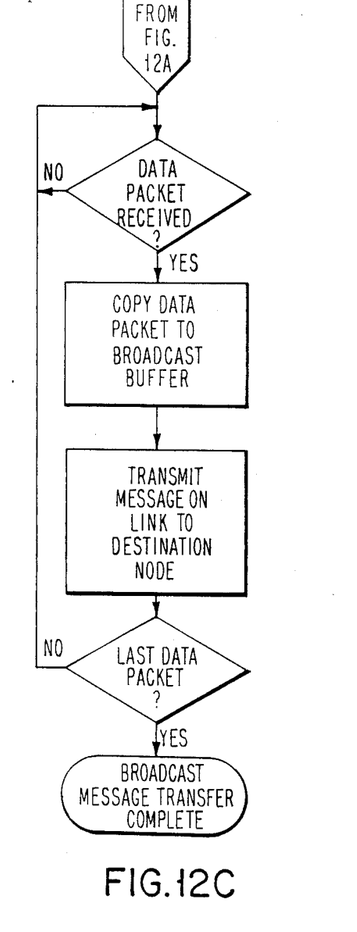

Four types of transactions between ring Controllers are supported in a single hub:

(1) Ring Controller Initialization (FIGS. 10A-10C).
(2) Message Transfer (FIGS. 11A-11D).
(3) Universal Address Message Transfer (FIGS. 11A-11D).
(4) Broadcast Message Transfer (FIGS. 12A-12C).

The Ring Initialization transaction sequence sets up the addresses for each of the Ring Controllers in a Hub after the Hub has been reset and initiates the operation of the hub. The Message Transfer (FIG. 6) and Universal Address Message Transfer (FIG. 8) transactions are used for point-to-point message transfers. Broadcast addressing (FIG. 7) from one Ring Controller to all Ring Controllers on the hub is also supported. Broadcast Message Transfer has additional sequencing and control needs that are handled by the Ring Monitor.

All three types of message transfer are able to handle transmissions across multiple hubs. The basic sequence on a single hub does not change. There are additional mechanisms to handle transmissions across multiple hubs.

PROTOCOL ERROR HANDLING

The possibility of packets used for communication getting corrupted exits, just as in any bus system. While it is a low probability, certain types of errors will disrupt the communication protocol and "hand" the Ring Controllers involved. This produces a deadlock on the involved Ring Controllers, as they are unable to complete their current transaction and cannot continue on to the next one. Eventually, the deadlock will extend to other ring Controllers as they attempt to communicate with the deadlocked controllers.

A source transmission timeout counter and a destination transmission timeout counter in the Ring Controllers prevent deadlock. The counters are started at the initiation of the transaction and reset at the completion. If an error in any part of the transaction prevents it from completing, eventually both timers reach their maximum value and cause the transmission to terminate. The Ring Controllers abort the transaction in process and move on to next one. Errors in any transaction will not hang the network, instead errors cause a temporary delay equal to the timeout value. Recovery of the aborted message is the responsibility of higher level protocols.

The initiation of the timeout counter and resetting at the completion is indicated in all the protocol diagrams. The exact timeout period is arbitrarily defined. All transactions are protected by the timeout counters.

RING BUS INITIALIZATION

Refer to FIGS. 10A-10C. The Ring Bus Initialization sequence forces all the Ring Controllers to an initial state in which they can be assigned addresses an begin operation. Cluster addresses have physical significance in the Cluster network, used to define unique locations and provide multiple hub routing. Each hub in a network is assigned a unique 8-bit identifier, called the Hub ID. Each Ring Controller on the hub is identified by an individual 8-bit Link ID. The initialization sequence is responsible for distributing the preassigned Hub ID and assigning the Link IDs. The combination of the two IDs provides a unique network address that can be used to an individual node attached to a hub. A node is attached via a link to a Ring Controller and takes on the Ring Controller Hub and Link IDs, providing it with a unique node address in the network.

RING CONTROLLER ADDRESS ASSIGNMENT

While Hub IDs are preassigned, Link IDs are assigned based on relative position of the ring controllers to the Ring Monitor. As shown in FIG. 1, there is a single Ring Monitor (12) per Hub and it is identified during Reset by asserting a mode pin on the controller. The Ring Monitor always has the O Link ID, with the downstream Ring Controller (14) assigned a Link ID of 1. Each downstream Ring Controller takes on a Link ID with a value of 1 greater than the upstream Ring Controller. A maximum of 256 Ring Controllers can exist on a single hub.

The Hub and Link IDs are assigned by the Initialization Command, which is in a Ring Packet without data. It consists of a single word (4 byte) packet header containing the Packet Identifier field (60) set to indicate Initialization Command, the Hub ID and the Link ID. The Link ID is set to 0 by the Ring Monitor before the packet is sent downstream by the Ring Monitor. Each Ring Controller, on receipt of the Initialization Command, copies the Hub ID and stores it in it's Hub ID Register. It then takes the Link ID and increments it by 1, placing the result in its Link ID Register and replacing the Link ID field of the Initialization Command with the incremented value. The packet is then sent on to the next downstream Ring Controller, which repeats the sequence. This continues until it reaches the Ring Monitor, which removes the packet from the ring and stores the incremented result which equals the total number of active Ring Controllers, exclusive of the Ring Monitor.

At this point all the Ring Controllers have been assigned their unique network addresses and are ready to begin operation. The Start Command from the Ring Monitor allows the Ring Controllers to start receiving from their links. They begin at the first start message boundary that they observe. If the node is sending any message at the time the Ring Controllers are started, it is ignored until it can receive the message from the beginning.

UNIVERSAL ADDRESS INITIALIZATION

The hub initialization sequence assigns the Local Address (native mode) Cluster addresses to the Ring Controllers. Universal addresses are also supported by the Cluster for compatibility the IEEE 802.3 standard. Universal addresses are initialized from the link with the source address from a message. All 802.3 node messages have a source address field (66) in the packet header of FIG. 4 that contains the node's address. After a Ring Controller has been initialized and has received the Start Command packet, it is ready to copy the node address of the node attached to the controller from the source field of the first message that the controller receives.

If the address in the source field is a Local Address, then the address stored in the controllers link ID register which was assigned during the initialization sequence is used. Any time after initialization that a Universal transfer request is recognized (FIG. 7), the universal address is used. This eliminates the need for explicitly assigning addresses from a network manager.

MESSAGE TRANSFER PROTOCOL

Refer to FIGS. 11A-11D. The Message Transfer Protocol is used for transferring messages from one Ring Controller to another on a single hub. The same basic protocol is used for both Local and Universal addressed messages, except for the initial transfer request sequence of the protocol. The differences arise in the address recognition part of the logic. Universal addresses have no physical significance and are 48 bits long. Local addresses are also 48 bits long, but only the last 16 bits (the Hub and Link IDs) are significant for routing between Ring Controllers.

LOCAL ADDRESSED MESSAGES

A message has a 32 bit Cluster Network Header appended to the beginning of the message when it is inserted into the network. The header is supplied by the Node Controller or, for 802.3 nodes, by the 802.3 interface in the Ring Controller to which the node is attached. The header is used only within the network and is removed before being passed over the link to the destination node.

The header serves to main purposes:
(1) Provide the destination Hub ID and Link ID.
(2) Provide a Propagation Counter to prevent endless looping of a message on a multi-hub network.

Figure 9:
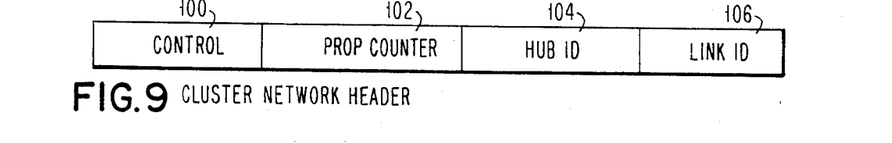
FIG. 9 is a diagram of the Cluster Network packet header.

The Cluster Network Header of FIG. 9 remains appended to the message until it reaches its destination. Its purpose is strictly to facilitate multiple hub routing for all messages and is not required on a single hub system. However, the Cluster is designed to support multiple hubs. Consequently, all messages carry the overhead of the Cluster Packet Header and are designed to use it in message routing.

The Hub ID (104) and Link ID (106) together define the "Native" Destination Address. The Control field (100) has been defined previously. The Propagation Counter (102) is an 8-bit countdown Counter used to identify the number of hubs traversed.

The Cluster Network Header is initialized at the point it is appended to the beginning of the message. The encoding of the control field is based on the destination address in the message. It indicates whether the destination address is a Universal or a Local address. In the case of a Local address, the Hub ID and Link ID fields are copied from the message into the equivalent fields of the Cluster Network Header. They remain uninitialized if the destination address is a Universal address. The Propagation Counter is always initialized to all 1's.

Ring hub interface logic in the Ring Controller initiates the transfer of a message received on its link. If the control field (100) of the Cluster network Header of the message indicates that the destination address is in the Hub ID/Link ID fields (104, 106) of the header, the Hub ID/Link ID is copied into a Transfer Request control packet (FIG. 5). The Transfer Request control packet is then placed on the Ring Bus to begin the transaction.

The complete transaction sequence is presented in FIGS. 11A–11D. The initial Transfer Request is shown followed by the transfer of each packet in response to the Send Packet Replies generated by the destination Ring Controller. The packet headers for each packet that make up the message are addressed with the destination address from the Cluster Network Header. All the information required for routing the message is in the Cluster Network Header.

UNIVERSAL ADDRESSED MESSAGES

Messages with Universal destination addresses contain no routing information for hub-to-hub routing. However, in a single hub network all nodes are attached to the same Ring Bus and do not require that routing information. Instead, the Universal address can be used for addressing the Ring Controllers whose assigned address match it, instead of the Hub ID/Link ID address. The difference in length (6 bytes versus 2 bytes) makes the Universal address unwieldy, so it is only used in the transfer request.

The Universal Transfer Request control packet (FIG. 7) contains the complete 6 byte Universal destination address copied from the message. Those Ring Controllers attached to 802.3 nodes that have Universal addresses compare the address in the Universal Transfer Request with their Universal address. If there is a match, it asserts "Packet Acknowledge" for the Transfer Request and copies its own Hub ID/Link ID into the appropriate fields of the Universal Transfer Request. The source Ring Controller removes the Universal Transfer Request from the bus, checking the Packet Acknowledge and acquiring the Hub ID/Link ID of the destination.

The source ring Controller now has the same information as for a Local address and can proceed as if that was the way in which it began. The Hub ID/Link ID is used for the destination address in the Data Transfer packet headers.

It should be noted that this works only for communication between nodes attached to the same hub. Going through multiple hubs requires the Local address of the destination node.

BROADCAST MESSAGE TRANSFER

Refer to FIGS. 12A–12C. Group or broadcast messages are identified by the first bit of the address for both Universal and Local formats. Local and Universal Group addresses are handled identically. The message is transferred to all nodes attached to the hub and through links attached to other hubs that are identified s part of the Broadcast Tree. All Ring controllers on the hub copy a message with a group or broadcast address and pass it on to their attached node. The node is responsible for interpreting the group message and determining if it is intended for the node.

Only a single Ring Controller is allowed to broadcast a message on the Ring bus at any given time. If multiple broadcasts were allowed, the Ring Controllers would have to be capable of receiving and storing multiple messages at once. The ordering of broadcast messages is accomplished by a queue in the Ring Monitor, which acts as a surrogate destination Ring Controller.

The destination Ring Controllers only have to contend with one broadcast message at a time, but they may be in the middle of a transaction with another node. A FIFO called the broadcast buffer in each Ring Controller provides another FIFO buffer in addition to the Output FIFO that is used to hold the incoming broadcast message. The Broadcast Buffer holds up to a complete 1.5K byte message, the maximum size allowed for broadcast (and 802.3 terminals).

BROADCAST BUFFER

Broadcasts messages are not guaranteed to reach all nodes. Blocking at a node or hub can cause the message to be dropped due to lack of buffer space. Unlike single node transfer requests, which are queued up in a request queue at a single destination, broadcast messages take their chances on the state the network and nodes at the time of transmission. Attempting to guarantee that all nodes are ready to receive a broadcast message before sending it would subvert the gains of concurrent message transmission. Not only would the source be held up waiting for every destination to be ready, but all the other sources and destinations would be held up waiting for the slowest to become ready.

The Broadcast Buffer (31) provides a compromise solution to the problem. Non-broadcast traffic continues while the broadcast message is stored in the Broadcast buffer. The broadcast message stored in the Ring Controller's broadcast buffer is transmitted to its attached node at the first available opportunity. A second broadcast message can arrive before the first has been sent to the node, and the second will be lost. The broadcast buffer does, however, prevent interference with the traffic in process at the time the broadcast is started.

RING MONITOR BROADCAST SUPPORT

The Ring Monitor is used to arbitrate all broadcast messages. It provides a central co-ordination point on the Ring Bug for those source Ring Controllers desiring to broadcast a message. Transfer requests for broadcast messages are made to the Ring Monitor, and are encoded as Broadcast Requests in the Packet Identifier field (78) of the Ring Packet Header (FIG. 6). the Ring Monitor queues broadcast requests as if they are normal requests, just as any destination Ring Controller would do. It then starts the actual transfer with Send Packet Reply and interacts with the source Ring Controller. The other Ring Controllers see the Broadcast Encoding in the Packet Header and copies the packet into their Broadcast Buffer.

The Ring Monitor enforces the ordering of Broadcasts, based on their arrival time, and also enforces a minimum time between broadcasts. A timer with a programmable maximum value is used to maintain a minimum interval between the start of each broadcast. The strategy is to provide the Ring Controllers a chance to transmit the previous contents of the broadcast buffer to its attached node before another broadcast message arrives. The interval required is dependent on the performance of the slowest links and the traffic patterns of the network. Making the interval programmable provides for adjusting the parameters.

RING CONTROLLER SUPPORT

Broadcast messages are completely buffered by the Ring Controller before it makes a Broadcast REquest to the Ring Monitor. Once the actual transfer begins, it proceeds at the maximum rate of the Ring Bus, rather than the rate at which is being received on the link. FIGS. 12A-12C illustrate the broadcast protocol for a group message.

While the invention has been particularly shown and described with reference to preferred embodiments thereof, it will be understood by those skilled in the art that the foregoing and other changes in form and detail may be made therein without departing from the scope of the invention.

What is claimed is:

1. For use in a star local area network, a hub capable of being connected to a plurality of nodes by means of a link interface medium, comprising:
   a bus;
   a plurality of ring controllers;
   each one of said ring controllers including link ID register means for storing a link ID, hub ID register means for storing a hub ID, means for buffering data packets, means for inserting data packets onto said bus, and ring monitor logic means for performing ring monitor functions;
   a ring monitor input line;
   said ring monitor logic means in each of said ring controllers being responsive to a signal on said ring monitor input line for activating said ring monitor logic in one ring controller to thereby designate, as a ring monitor controller, said one ring controller whose monitor input line is activated; and,
   first means in said Ring Monitor logic means operable in said one ring controller whose monitor input line had been activated for generating an initialization command containing the contents of said link ID register and said hub ID register and for causing said inserting means to insert said initialization command onto said bus;
   second means in the Ring Monitor logic means operable in another ring controller whose monitor input line had not been activated for, upon receipt of an initialization command, storing said link ID in the link ID register of said other ring controller, for storing said hub ID in the hub ID register of said other ring controller, for generating a new link ID having a value greater than said link ID and for placing a new initialization command containing said hub ID and said new link ID onto said bus.

2. The combination in accordance with claim 1 wherein:
   said ring Monitor logic means includes third means operable in said one ring controller whose monitor input line had been activated for receiving a hub ID on said ring monitor input line and means for storing said hub ID in said hub ID register.

3. The combination in accordance with claim 1 wherein:
   said one Ring controller whose monitor input line had been activated is assigned a Link ID of 0, and said other Ring Controller whose monitor input line had not been activated is assigned a Link ID of 1 greater than said link ID;
   said Initialization Command is comprised of a packet header containing a Packet Identifier field set to indicate Initialization Command, a Hub ID field and a Link ID field; and
   said second means for generating a new link ID having a value greater than said link ID in said ring Monitor logic means includes means for incrementing said Link ID by 1 and means for replacing the Link ID field of said Initialization Command with the incremented value to thereby create said new initialization command.

4. The combination in accordance with claim 1 further comprising:
   a common clock for generating a series of ring bus cycles;
   means for driving said plurality of controllers by said common clock;
   wherein each Ring Controller has an Input Port used for receiving packets from an upstream Ring Controller and an Output Port for transmitting packets to a downstream Ring controller;
   said ports being unidirectional ports, one receiving only, the other transmitting, data being transferred from every Output Port to every Input Port on the ring Bus each Ring Bus Cycle of said common clock.

5. The combination in accordance with claim 4 wherein said bus is comprised of a set of parallel lines for carrying control signals and for carrying said data packets, each data packet requiring a number of contiguous bus cycles, said control signals including:
   at least two Cycle Type signals capable of being encoded, for identifying the current state of a packet transfer on said bus, a first encoding of said Cycle Type signals identifying the first cycle of a packet, a second encoding of said Cycle Type signals identifying all cycles between the first and last, and a third encoding of said Cycle Type signals identifying the last cycle of a packet.

6. The combination in accordance with claim 4 wherein said bus is comprised of a set of parallel lines for carrying control signals and for carrying said data packets, each data packet requiring a number of contiguous bus cycles, said control signals including:
   a Packet Ack signal for signalling that a packet has been received by said controller.

7. The combination in accordance with claim 4 wherein said bus is comprised of a set of parallel lines for carrying control signals and for carrying said data packets, each data packet requiring a number of contiguous bus cycles, said control signals including:
   a Monitor signal for signalling that a packet contains an error.

8. The method of initializing a ring bus hub in a star local area network comprising the steps of:
   (A) connecting a plurality of ring controllers;
   (B) activating a ring monitor logic in one of said ring controllers to thereby designate said one ring controller as a ring monitor controller;
   (C) generating, from said ring monitor controller, an initialization command containing the contents of a link ID register and a hub ID register in said ring monitor controller;
   (D) inserting said initialization command onto said bus;
   (E) receiving said initialization command into one of said ring controllers connected to said ring monitor controller;

(F) storing said link ID in a link ID register at said ring monitor controller;

(G) storing said hub ID in a hub ID register at said ring monitor controller;

(H) generating a new link ID having a value greater than the link ID in said link ID register; and (I) placing a new initialization command containing said hub ID and said new link ID onto said bus.

9. The method in accordance with claim 8 further comprising the steps of:

(J) receiving into said Ring Monitor logic, a hub ID on said ring monitor input line and (K) storing said hub ID in said hub ID register.

10. The method in accordance with claim 8 wherein said Initialization Command is comprised of a packet header containing a Packet Identifier field set to indicate Initialization Command, a Hub ID field and a Link ID field said method further comprising the step of:

(J) assigning to said Ring Monitor a Link ID of 0;

(K) assigning to each Ring Controller a Link ID of 1 greater than the link ID of the next previous ring controller; and, (L) incrementing said link ID by 1 and replacing the Link ID field of said Initialization Command with the incremented value.

11. The method in accordance with claim 8 further comprising the step of:

(J) generating a series of ring bus cycles; and, (K) driving all of said controllers by series of ring bus cycles;

(L) receiving packets from an upstream Ring Controller on each ring bus cycle; and, (M) transmitting packets to a downstream Ring Controller on each ring bus cycle.

12. The method in accordance with claim 8 wherein said plurality of ring controllers include a source ring controller and a destination ring controller further comprising the steps of:

J. sending a Transfer Request control packet from said source ring controller to said destination ring controller to start a data transfer;

K. queueing said transfer request control packet in a request queue in said destination ring controller (16) until said destination ring controller is ready to receive said data;

L. sending a Send Data Reply control packet from said destination ring controller addressed to said source ring controller upon the condition that said destination Ring Controller is ready to receive said data;

M. sending a Data Packet from said source ring controller in response to said Send Data Reply control packet; and, N. placing Transfer Request packets received during a current message transfer in said Request queue of said destination ring controller.

* * * * *